(12) United States Patent
Deshpande (10) Patent No.: US 8,984,484 B2
(45) Date of Patent: Mar. 17, 2015

(54) VIDEO SEQUENCE RECORDING DURING A TESTING SESSION ON A DATA PROCESSING DEVICE TO ENABLE FAULT DETECTION

(71) Applicant: NVIDIA Corporation, Santa Clara, CA (US)

(72) Inventor: Shounak Santosh Deshpande, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 102 days.

(21) Appl. No.: 13/685,714

(22) Filed: Nov. 27, 2012

(65) Prior Publication Data

US 2014/0149967 A1     May 29, 2014

(51) Int. Cl.
*G06F 9/44*     (2006.01)
*G06F 11/36*     (2006.01)

(52) U.S. Cl.
CPC .................................. *G06F 11/362* (2013.01)
USPC ............................................................ 717/124

(58) Field of Classification Search
None
See application file for complete search history.

(56) References Cited

U.S. PATENT DOCUMENTS

| 6,202,173 | B1 | 3/2001 | Hollett et al. |
| 7,694,181 | B2 | 4/2010 | Noller et al. |
| 8,059,882 | B2 | 11/2011 | Amidi |
| 8,239,831 | B2 | 8/2012 | Brennan et al. |
| 8,504,994 | B2 * | 8/2013 | Golender et al. ............. 717/128 |
| 2012/0243745 | A1 | 9/2012 | Amintafreshi |

OTHER PUBLICATIONS http://www.bbtestassistant.com/.
http://silverbackapp.com/.
https://www.google.co.in/url?sa=t&rct=j&q=&esrc=s&
source=web&cd=7&cad=rja&sqi=2&ved=0CGcQFjAG&url=
http%3A%2F%2Fwww.origsoft.
com%2Fwhitepapers%2Fsoftware-testing-glossary%2Fglossary_
of_terms.pdf&ei=6zykUefGFobVrQe124CAAg&usg=
AFQjCNGnQ-9c5SL-b2G-cOuaXD5W42z29g&bvm=bv.
47008514,d.bmk.

* cited by examiner

*Primary Examiner* — Don Wong
*Assistant Examiner* — Deric Ortiz
(74) *Attorney, Agent, or Firm* — Zilka-Kotab, PC (57) ABSTRACT

A method includes continuously capturing, through an application executing on a data processing device, images of a desktop of the data processing device as a background process as part of a testing session on the data processing device in an active mode thereof. The method also includes encoding, through a processor of the data processing device, the captured images of the desktop as a video sequence, and providing a capability to a user of the data processing device and/or another data processing device to detect a fault event related to the testing session based on access to the encoded video sequence.

20 Claims, 8 Drawing Sheets

VIDEO SEQUENCE RECORDING DURING A TESTING SESSION ON A DATA PROCESSING DEVICE TO ENABLE FAULT DETECTION

FIELD OF TECHNOLOGY

This disclosure relates generally to software testing and quality assurance and, more particularly, to video sequence recording during a testing session on a data processing device to enable fault detection.

BACKGROUND

Throughout a process of software development, a user experience of a software product may be monitored through one or more quality assurance testing sessions, which focuses on the detection of a fault event (e.g., software bug, software defect) associated with the execution of the software product on a data processing device (e.g., a desktop computer, a workstation, a laptop computer). Following investigation of the fault event, a considerable amount of time may be wasted in reconstructing specific events of the fault event and/or diagnosing possible causes thereof in the form of a test report, during a phone call, in an e-mail communication etc. In addition, a tester's interpretation of the fault event and the software developer's interpretation thereof may differ. Further, a language barrier may exist between the tester and the software developer due to a global presence of the organization/organization(s) they are part of. The aforementioned difference in interpretations and/or language barrier may serve to further complicate appropriate diagnoses of the fault event, thereby hindering the software development process.

SUMMARY

Disclosed are a method, a device and/or a system of video sequence recording during a testing session on a data processing device to enable fault detection.

In one aspect, a method includes continuously capturing, through an application executing on a data processing device, images of a desktop of the data processing device as a background process as part of a testing session on the data processing device in an active mode thereof. The method also includes encoding, through a processor of the data processing device, the captured images of the desktop as a video sequence, and providing a capability to a user of the data processing device and/or another data processing device to detect a fault event related to the testing session based on access to the encoded video sequence.

Through a user interface of the application, the user may be provided a capability to specify one or more shortcut(s) to start the image capturing and/or stop the image capturing. The image capturing may be configured through the user interface to stop immediately after detection of the fault event through the data processing device. The one or more shortcut(s) may be a hotkey input through a keyboard of the data processing device, an input from a mouse of the data processing device and/or a voice command to the data processing device.

Through the application, the user may be provided a capability to automatically store the video sequence to a memory of the data processing device, to save the video sequence to the memory and/or to tag the video sequence onto a test report of the testing session to enable contextual access thereof. Further, the application may provide a capability to capture audio data from the user during the testing session through a microphone associated with the data processing device, a capability to record keystrokes and/or mouse inputs from the user during the testing session and/or a capability to tag the captured audio data and/or the recorded keystrokes and/or the mouse inputs onto the test report.

Further, the method may involve monitoring, through the application, utilization of the memory of the data processing device during the testing session, and adapting the storing of the images and/or the encoding thereof based on the monitored utilization of the memory of the data processing device.

In another aspect, a non-transitory medium, readable through a data processing device and including instructions embodied therein that are executable through the data processing device is disclosed. The non-transitory medium includes instructions to continuously capture, through an application executing on the data processing device, images of a desktop of the data processing device as a background process as part of a testing session on the data processing device in an active mode thereof. The non-transitory medium also includes instructions to encode, through a processor of the data processing device, the captured images of the desktop as a video sequence, and instructions to provide a capability to a user of the data processing device and/or another data processing device to detect a fault event related to the testing session based on access to the encoded video sequence. The non-transitory medium may also include instructions to enable one or more capabilities of the application discussed above.

In yet another aspect, a data processing device includes a memory, and a processor communicatively coupled to the memory. The processor is configured to encode captured images of a desktop of the data processing device as a video sequence to be stored in the memory. The images are continuously captured through an application executing on the data processing device as a background process as part of a testing session on the data processing device in an active mode thereof. The application thereby provides a capability to a user of the data processing device and/or another data processing device to detect a fault event related to the testing session based on access to the encoded video sequence. The application also may possess one or more capabilities discussed above.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system of video sequence recording during a testing session on a data processing device to enable fault detection. Although the present embodiments have been described with reference to specific example embodiments, it will be evident that various modifications and changes may be made to these embodiments without departing from the broader spirit and scope of the various embodiments.

FIGS. 1-7 show a data processing device 202 (see FIG. 2) within the context of a testing session 108, according to one or more embodiments. In one or more embodiments, data processing device 202 may be a laptop computer, a personal desktop computer, a workstation, a personal digital assistant or a server. Other forms of data processing devices 202 capable of having testing session 108 conducted thereon are within the scope of the exemplary embodiments. In one or more embodiments, data processing device 202 may include a processor 450 (e.g., Central Processing Unit (CPU), Graphics Processing Unit (GPU); see FIG. 4) communicatively coupled to a memory 400 (e.g., volatile memory, non-volatile memory). In one or more embodiments, processor 450 may execute instructions associated with one or more of the processes discussed herein.

Figure 1:
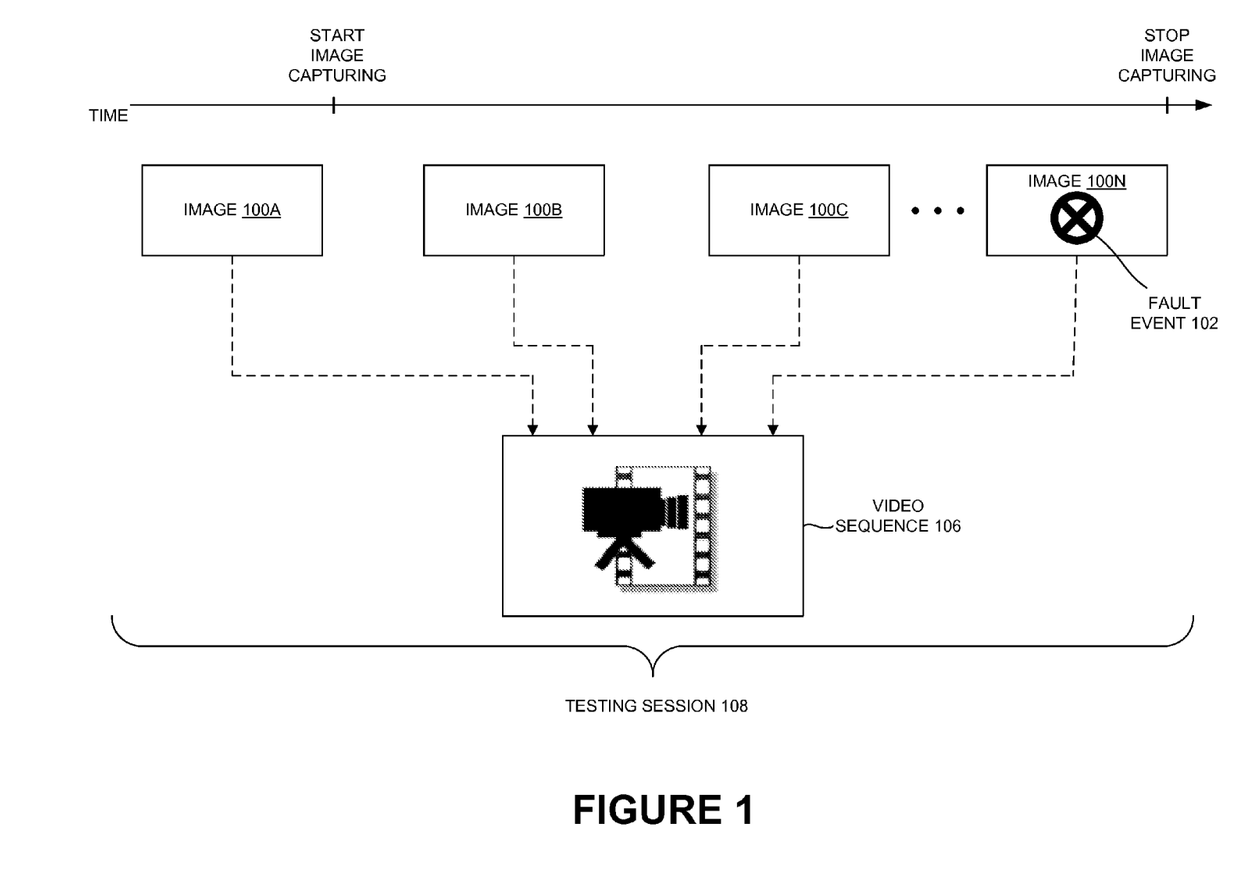
FIG. 1 is a schematic view of capturing desktop images of a data processing device as part of a testing session, according to one embodiment.
Figure 2:
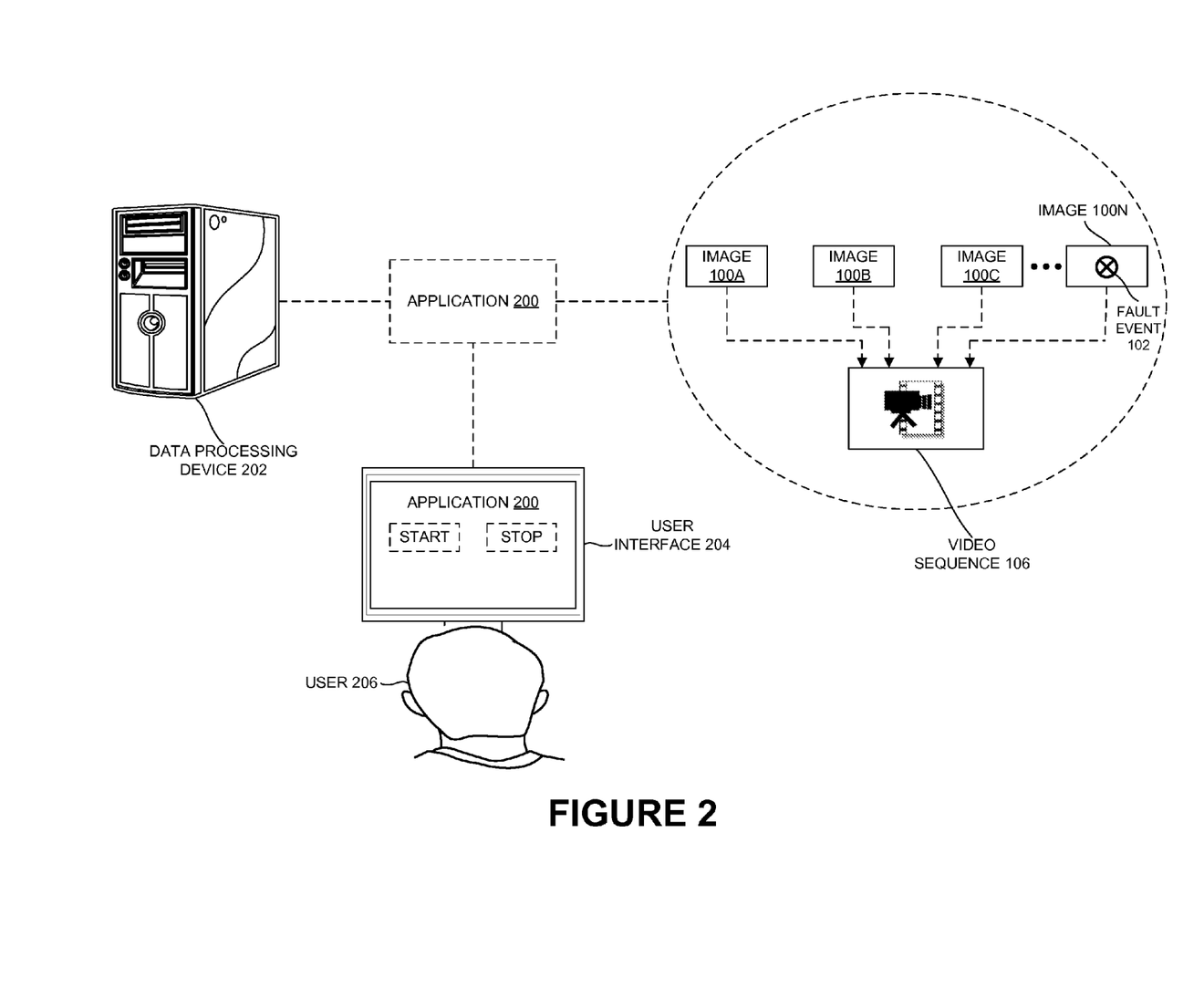
FIG. 2 is a schematic view of an application utilized for the desktop image capturing of FIG. 1, according to one embodiment.

In one or more embodiments, testing session 108 may be part of a quality assurance activity associated with data processing device 202; the quality assurance test may be performed for a software product installed/to be installed on data processing device 202. In one or more embodiments, testing session 108 may yield a fault event 102 (e.g., a software bug). Examples of fault event 102 include but are not limited to video corruption, desktop corruption and frame drops. In one or more embodiments, data processing device 202 may execute an application 200 for the purpose of fault detection (or, detecting fault event 102) during testing session 108.

Figure 4:
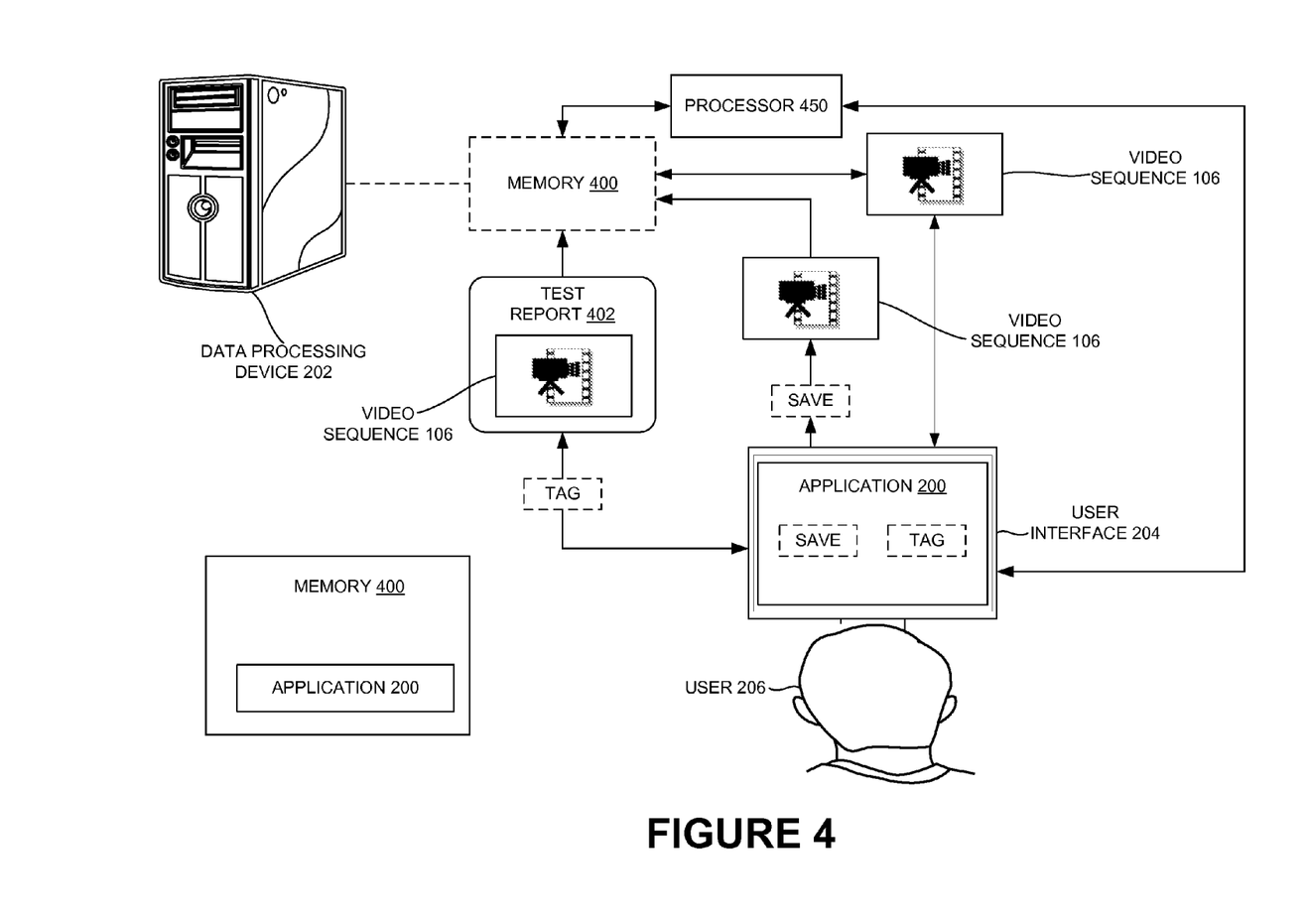
FIG. 4 is a schematic view of the application of FIG. 2 providing a capability to save the video sequence and tag the video sequence onto a test report.

FIG. 4, for example, shows application 200 as part of memory 400; it is obvious that processor 450 may enable execution of instructions associated with application 200. In one or more embodiments, application 200 may provide a user 206 of data processing device 202 an interface (e.g., user interface 204) to begin testing session 108. In one or more embodiments, application 200 may enable user 206 to continuously capture desktop images 100A-100N of data processing device 202 as a background process during testing session 108. In one or more embodiments, data processing device 202 may be in an active mode of operation thereof during testing session 108. For example, during the active mode, user 206 may execute other tasks on data processing device 202 while instructions associated with the testing process execute on data processing 202 and desktop images 100A-100N are continuously captured.

Figure 3:
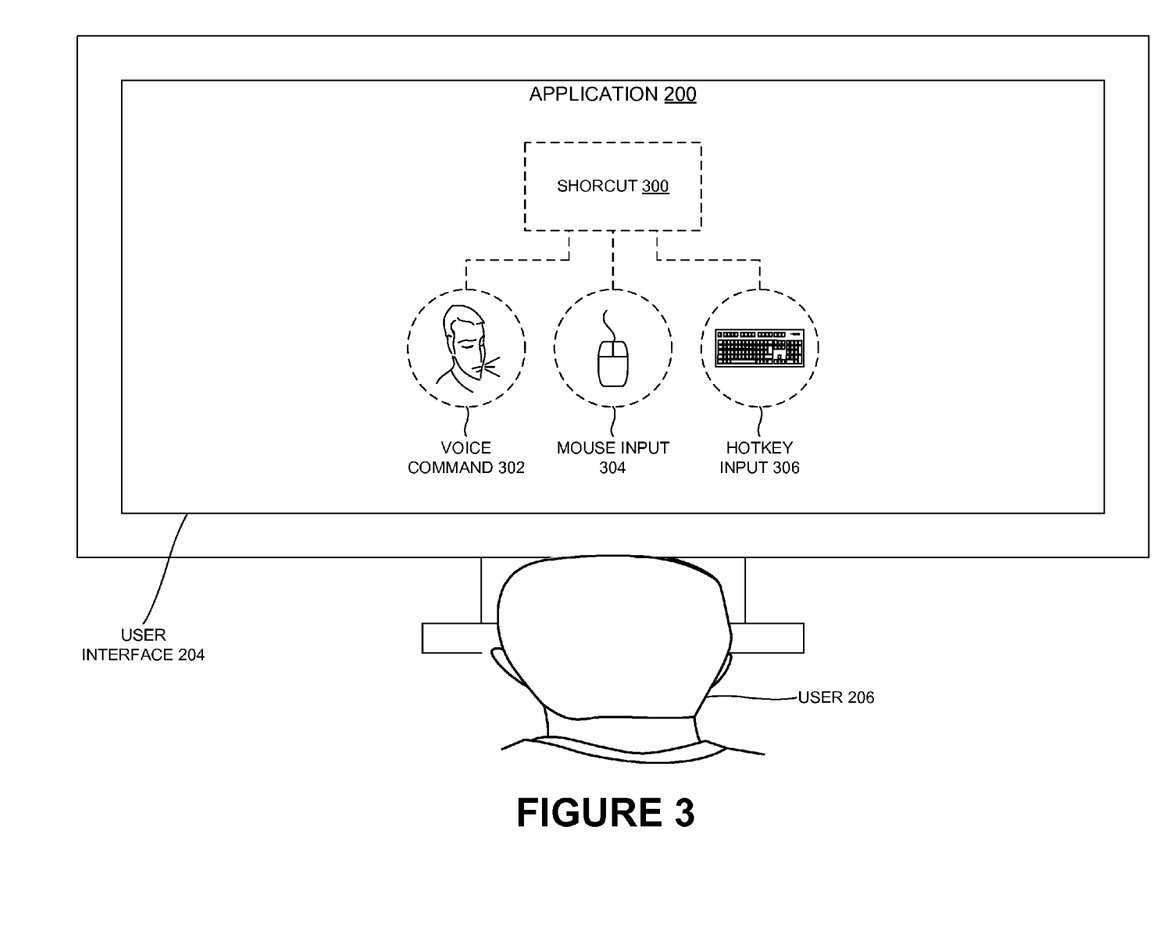
FIG. 3 is a schematic view of a user interface of the application of FIG. 2, through which a shortcut to initiate and/or terminate the desktop image capturing of FIG. 1 is configured.

In one or more embodiments, user interface 204 may enable user 206 initiate testing session 108 through one or more shortcut(s) (to be discussed below). In one or more embodiments, the one or more shortcut(s) (e.g., shortcut 300) may be utilized to start and/or stop the capturing of desktop images 100A-100N. For example, the same shortcut/shortcut(s) may be utilized for both starting and stopping the capturing of desktop images 100A-100N. It is obvious that different shortcuts may be employed for starting and stopping the aforementioned capturing. In one or more embodiments, shortcut 300 may be a hotkey input 306 (e.g., Ctrl+Alt+R), a voice command 302 (e.g., sensed through a microphone sensor associated with data processing device 202), a mouse input 304 (e.g., an input pattern through a mouse associated with data processing device 202) or a combination thereof. Other possible examples of shortcut 300 are within the scope of the exemplary embodiments.

In one or more embodiments, user 206 may be provided the ability to configure the image capturing to stop immediately after detection of fault event 102. In alternate embodiments, the aforementioned configuration may be automatic (e.g., through driver component, engines/modules executing on processor 450, engines/modules executing in conjunction with application 200). It is obvious that user 206 may definite shortcut 300 (see FIG. 3). In the case of image capturing being configured to stop immediately after the detection of fault event 102, shortcut 300 may not be required therefor.

It is obvious that when testing session 108 involves voice command 302 as input and/or mouse input 304, appropriate processing capabilities may be provided in data processing device 202. In one or more embodiments, hotkey input 306 may involve the use of a key or a combination of keys on a keyboard associated with data processing device 202. It is possible that user 206 may opt for one form of input (e.g., voice command 302) for starting the image capturing and another form of input (e.g., hotkey input 306, mouse input 304) for terminating the image capturing. In one or more embodiments, when desktop images 100A-100N are continuously being captured during testing session 108, processor 450 may be configured to encode the aforementioned captured desktop images 100A-100N as a video sequence 106. It is obvious that data processing device 202 may execute an appropriate encoding engine (e.g., stored in memory 400 and executed on processor 450, associated with application 200) therefor.

In one or more embodiments, the abovementioned encoding may involve combining desktop images 100A-100N as video sequence 106 such that desktop images 100A-100N are arranged as frames in a chronological, sequential order. FIG. 4 illustrates user 206 having a capability to save video sequence 106 into memory 400 of data processing device 202; it is obvious that video sequence 106 may also be automatically be stored in memory 400 after image capturing and combining discussed above. In one embodiment, application 200 may enable user 206 to manually save video sequence 106 into memory 400 through user interface 204; user interface 204 may be accessed on a display unit (e.g., a Liquid Crystal Display (LCD)) of data processing device 202.

In one or more embodiments, application 200 may also provide user 206 a capability to tag video sequence 106 onto a test report 402 (see FIG. 4). In one or more embodiments, test report 402 may be a summary of testing session 108 including a description of fault event 102, if detected. In one or more embodiments, the aforementioned video sequence 106 may enable a party (e.g., a user at another data processing device) to which test report 402 is transmitted (e.g., by e-mail) to readily attend to a fault/issue causing fault event 102. Moreover, in one or more embodiments, user 206 may be able to provide for a better description of fault event 102 and possible solutions therefor in test report 402 based on video sequence 106.

Figure 5:
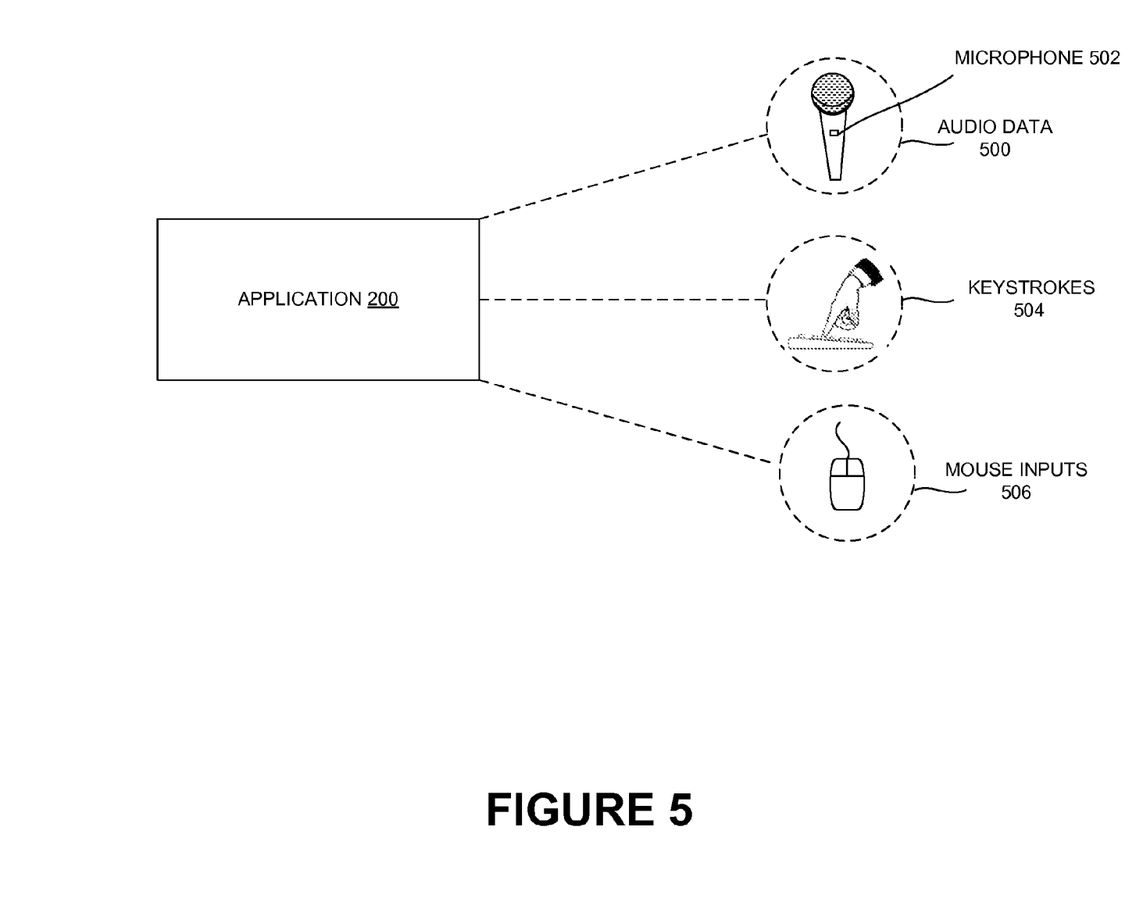
FIG. 5 a schematic view of the application of FIG. 2 providing a capability to capture audio data during the testing session of FIG. 1 through a microphone, and to record keystrokes and/or mouse inputs during the testing session.
Figure 6:
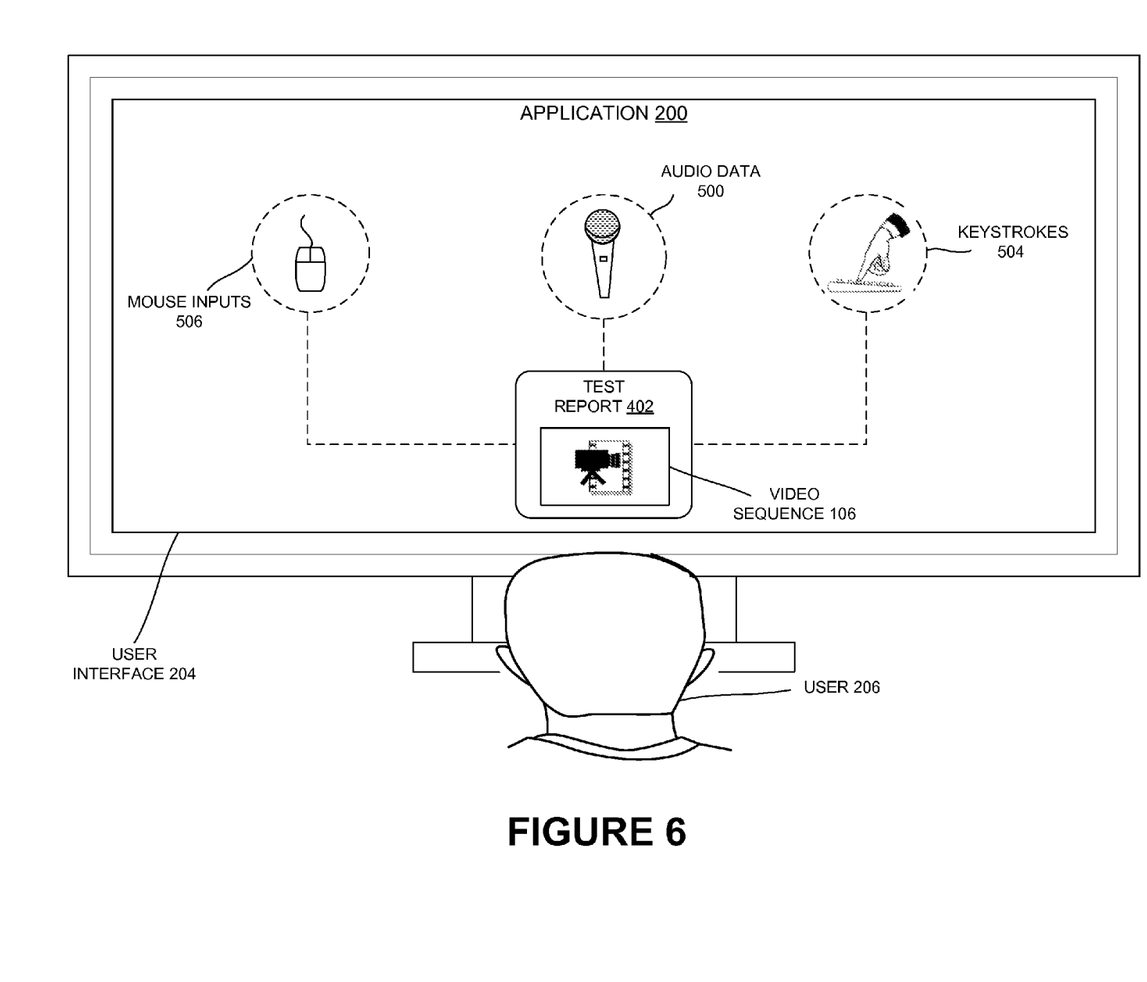
FIG. 6 is a user interface view demonstrating a capability of a user to tag the captured audio data, the recorded keystrokes and/or the mouse inputs of FIG. 5 onto the test report of FIG. 4.
Figure 7:
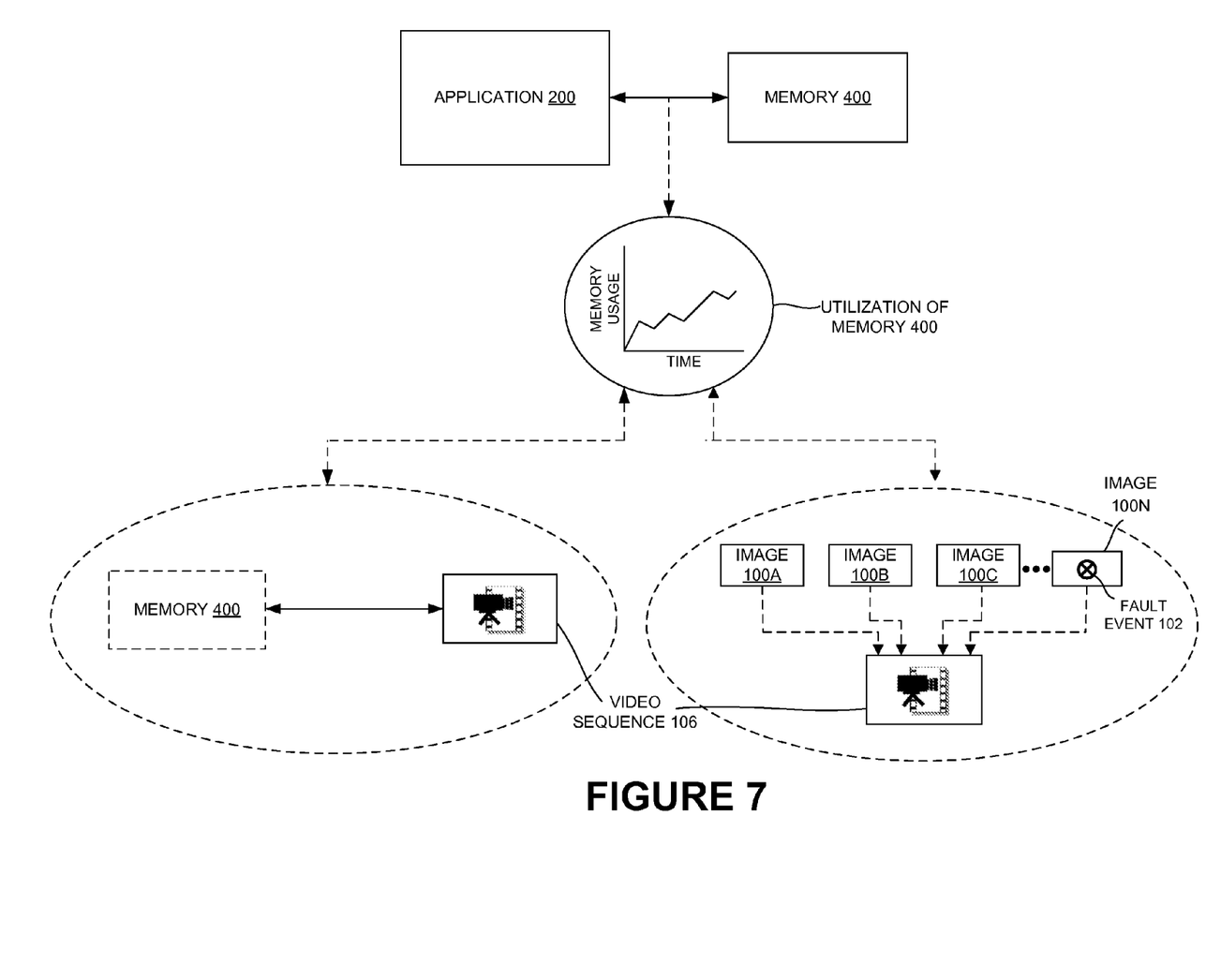
FIG. 7 is a schematic view demonstrating monitoring a utilization of the memory of FIG. 4 through the application of FIG. 2 during the testing session of FIG. 1.

In one or more embodiments, application 200 may enable user 206 to provide supplemental information in test report 402. For example, the supplemental information may be audio data 500 captured (e.g., recorded through microphone 502) by user 206, a record of keystrokes (e.g., keystrokes 504) of user 206 and/or mouse inputs 506 (e.g., record of mouse clicks). In one or more embodiments, user 206 may also tag the aforementioned supplemental information onto test report 402 (see FIG. 6) to further aid debugging the problem(s) associated with fault event 102. User 206 may provide instructions through microphone 502 that may be recorded as audio data 500; the aforementioned audio data 500 may be listened to by another party doing the debugging and the instructions therein adhered to. Event logs/timestamps of mouse inputs 506 and/or keystrokes 504 may also be utilized in test report 402.

In one example embodiment, tagging the supplemental information may involve integrating audio data 500, keystrokes 504 and/or mouse inputs 506 into one or more files and transmitting the aforementioned one or more files along with test report 404. In one or more embodiments, utilization of memory 400 (see FIG. 7; utilization may be determined based on testing session 108 and other tasks concurrently executing on data processing device 202) during testing session 108 may be monitored through application 200. Based on the monitoring of the utilization of memory 400, the storing of desktop images 100A-100N and/or the encoding thereof may be adapted. For example, when high utilization of memory 400 is detected, the storing of desktop images 100A-100N and/or the encoding thereof may be optimized through increasing time intervals between desktop images 100A-100N, compressing video sequence 106, decreasing resolution of video sequence 106 etc.

In one or more embodiments, instructions associated with the initiation of the abovementioned image capturing, generation of video sequence 106 et al. may be executed based on an appropriate engine (e.g., stored in memory 400, implemented in application 200, implemented along with an operating system executing on data processing device 202, implemented as a driver component) implemented in data processing device 202. The aforementioned instructions may be embodied on a non-transitory medium (e.g., Compact Disc (CD), Digital Video Disc (DVD), Blu-ray Disc™) readable through data processing device 202. Alternately, the aforementioned instructions may be embodied in one or more file(s) downloaded from the Internet into memory 400 and installed on data processing device 202.

An example scenario involving testing session 108 will now be described in which exemplary embodiments discussed herein play an important role. A user working in a quality assurance department of a company (say, XYZ Technologies) may conduct testing session 108 on a product called Alpha. Alpha may be a software product being developed by software engineers at XYZ Technologies. As such, testing engineers, such as user 206, may be employed by XYZ Technologies to determine the usability of Alpha in a current state thereof.

In order to effectively communicate details regarding bugs/defects in Alpha to the software engineers/debugging engineers, user 206 may transmit test report 402 thereto. The software engineers/debugging engineers may be located in a country that is different from the country of user 206. For example, XYZ Technologies may be headquartered in the United States of America (USA), which may be the location of user 206; XYZ Technologies may also have an office in India where the software engineers/debugging engineers are located. As it may be difficult for the software engineers/debugging engineers to understand the American accent of user 206 and, thereby, comprehend issues to get a complete picture, test report 402 including video sequence 106 may be utilized therefor. Video sequence 106 may enable easy comprehension of fault event 102 and expedite debugging of problems.

Figure 8:
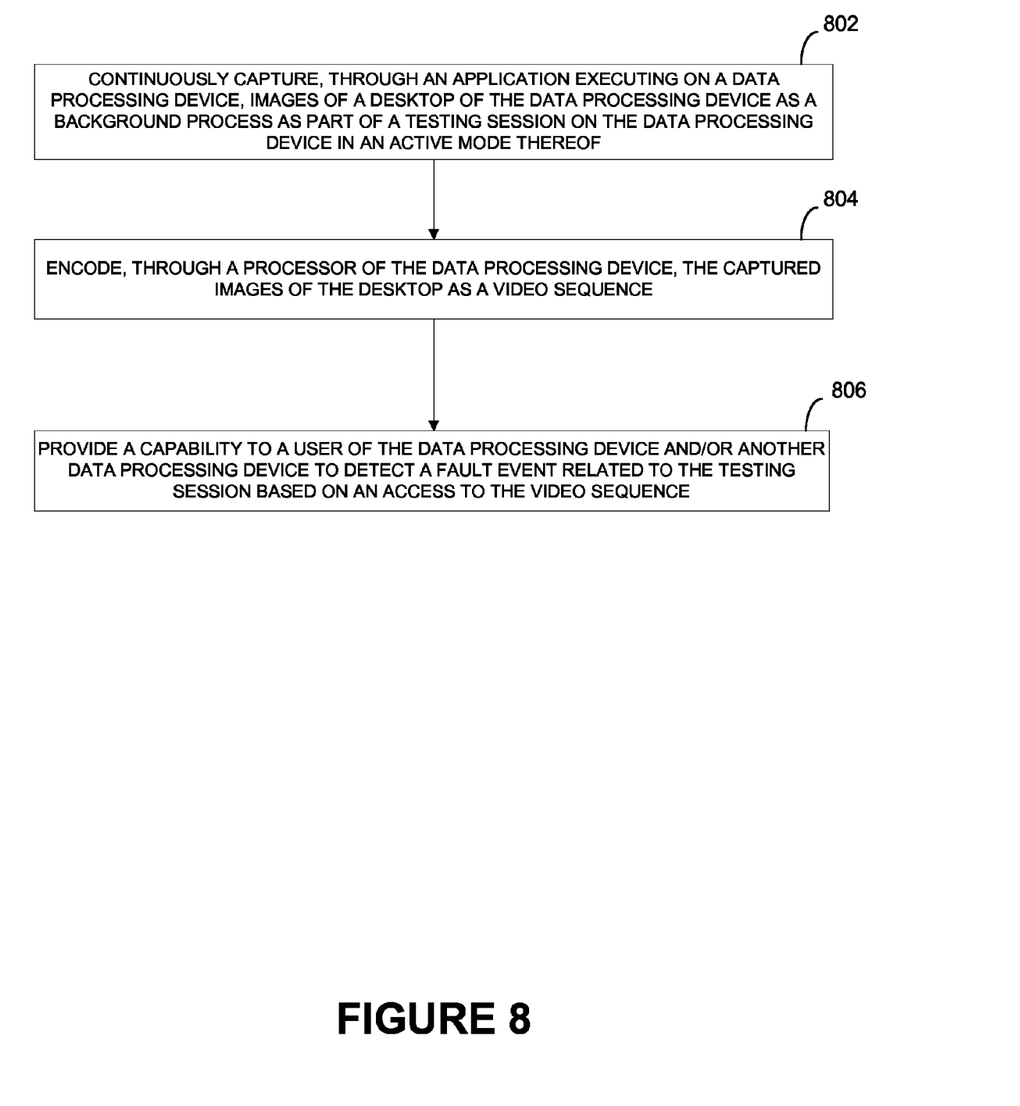
FIG. 8 is a process flow diagram detailing the operations involved in video sequence recording during a testing session on a data processing device to enable fault detection, according to one or more embodiments.

FIG. 8 shows a process flow diagram detailing the operations involved in video sequence recording during testing session 108 on data processing device 202 to enable fault detection, according to one or more embodiments. In one or more embodiments, operation 802 may involve continuously capturing, through application 200 executing on data processing device 202, images (e.g., desktop images 100A-100N) of a desktop of data processing device 202 as a background process as part of testing session 108 on data processing device 202 in an active mode thereof.

In one or more embodiments, operation 804 may involve encoding, through processor 450 of data processing device 202, the captured images of the desktop as video sequence 106. In one or more embodiments, operation 806 may then involve providing a capability to a user (e.g., user 206) of data processing device 202 and/or another data processing device to detect fault event 102 related to testing session 108 based on access to the encoded video sequence 106.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a non-transitory machine-readable medium). For example, the various electrical structure and methods may be embodied using transistors, logic gates, and electrical circuits (e.g., Application Specific Integrated Circuitry (ASIC) and/or Digital Signal Processor (DSP) circuitry).

In addition, it will be appreciated that the various operations, processes, and methods disclosed herein may be embodied in a non-transitory machine-readable medium and/or a machine accessible medium compatible with a data processing system (e.g., data processing device 100), and may be performed in any order (e.g., including using means for achieving the various operations).

Accordingly, the specification and drawings are to be regarded in an illustrative rather than a restrictive sense.

What is claimed is:
1. A method comprising:
continuously capturing, through an application executing on a data processing device, images of a desktop of the data processing device as a background process as part of a testing session on the data processing device in an active mode thereof;

monitoring, through the application, utilization of a memory of the data processing device during the testing session;

adapting, based on the monitored utilization of the memory of the data processing device, storage of the captured images by at least one of: increasing a time interval between capturing each of the images and decreasing a resolution of the captured images;

encoding, through a processor of the data processing device, the captured images of the desktop as a video sequence; and providing a capability to a user of at least one of the data processing device and another data processing device to detect a fault event related to the testing session based on access to the encoded video sequence.

2. The method of claim 1, further comprising:

providing, through a user interface of the application, a capability to the user to specify at least one shortcut to at least one of: start the image capturing and stop the image capturing.

3. The method of claim 1, further comprising:

configuring, through a user interface of the application, the image capturing to stop immediately after detection of the fault event through the data processing device.

4. The method of claim 1, wherein providing the capability to the user to detect the fault event related to the data processing device based on the access to the video sequence includes providing, through the application a capability to the user to tag the video sequence onto a test report of the testing session to enable contextual access thereof.

5. The method of claim 1, further comprising providing, through the application, a capability to capture audio data from the user during the testing session through a microphone associated with the data processing device.

6. The method of claim 1, further comprising compressing the video sequence based on the monitored utilization of the memory of the data processing device.

7. A non-transitory medium, readable through a data processing device and including instructions embodied therein that are executable through the data processing device, comprising:

instructions to continuously capture, through an application executing on a data processing device, images of a desktop of the data processing device as a background process as part of a testing session on the data processing device in an active mode thereof;

monitoring, through the application, utilization of a memory of the data processing device during the testing session;

adapting, based on the monitored utilization of the memory of the data processing device, storage of the captured images by at least one of: increasing a time interval between capturing each of the images and decreasing a resolution of the captured images;

instructions to encode, through a processor of the data processing device, the captured images of the desktop as a video sequence; and instructions to provide a capability to a user of at least one of the data processing device and another data processing device to detect a fault event related to the testing session based on access to the sequence.

8. The non-transitory medium of claim 7, further comprising:

instructions to provide, through a user interface of the application, a capability to the user to specify at least one shortcut to at least one of: start the image capturing and stop the image capturing.

9. The non-transitory medium of claim 7, further comprising:

instructions to configure, through a user interface of the application, the image capturing to stop immediately after detection of the fault event through the data processing device.

10. The non-transitory medium of claim 7, further comprising instructions to provide a capability to the user to tag the video sequence onto a test report of the testing session to enable contextual access thereof.

11. The non-transitory medium of claim 7, further comprising instructions to provide, through the application, a capability to capture audio data from the user during the testing session through a microphone associated with the data processing device.

12. The non-transitory medium of claim 7, further comprising instructions to compress the video sequence based on the monitored utilization of the memory of the data processing device.

13. A data processing device comprising:

a memory; and a processor communicatively coupled to the memory, the processor being configured to:

encode captured images of a desktop of the data processing device as a video sequence to be stored in the memory, the images being continuously captured through an application executing on the data processing device as a background process as part of a testing session on the data processing device in an active mode thereof;

monitor, through the application, utilization of the memory during the testing session;

adapt, based on the monitored utilization of the memory, storage of the captured images by at least one of: increasing a time interval between capturing each of the images and decreasing a resolution of the captured images; and providing, through the application, a capability to a user of at least one of the data processing device and another data processing device to detect a fault event related to the testing session based on access to the video sequence.

14. The data processing device of claim 13, wherein the application is configured to provide a capability to the user to specify at least one shortcut through a user interface to at least one of: start the image capturing and stop the image capturing.

15. The data processing device of claim 13, wherein a user interface provides the user a capability to configure the image capturing to stop immediately after detection of the fault event through the data processing device.

16. The data processing device of claim 13, wherein the application is further configured to provide a capability to the user to tag the video sequence onto a test report of the testing session to enable contextual access thereof.

17. The data processing device of claim 13, wherein the application is further configured to provide a capability to capture audio data from the user during the testing session through a microphone associated with the data processing device.

18. The method of claim 5, further comprising providing a capability to the user to tag the captured audio data onto the test report of the testing session.

19. The non-transitory medium of claim 7, further comprising instructions to provide a capability to the user to tag the captured audio data onto the test report of the testing session.

20. The data processing device of claim 13, wherein the application is further configured to provide a capability to the user to tag the captured audio data onto the test report of the testing session.

\* \* \* \* \*